United States Patent [19]

Fukui et al.

[11] 4,427,803

[45] Jan. 24, 1984

[54] MOLD RELEASE COMPOSITION

[75] Inventors: Shoshin Fukui, Toyonaka; Masayoshi Shinjo, Settsu; Hirokazu Aoyama, Osaka, all of Japan

[73] Assignee: Daikin Kogyo Co., Ltd., Osaka, Japan

[21] Appl. No.: 491,236

[22] Filed: May 3, 1983

[30] Foreign Application Priority Data

May 14, 1982 [JP] Japan .................................. 57-82165

[51] Int. Cl.$^3$ ............................ B28B 7/36; C08J 3/18; C08L 63/00

[52] U.S. Cl. ............................... 523/402; 106/38.22; 106/38.25; 264/338; 427/133; 427/135; 523/435; 523/465; 524/267

[58] Field of Search .......................... 106/38.22, 38.25; 264/338; 427/133, 135; 523/402, 435, 465; 524/267

[56] References Cited

U.S. PATENT DOCUMENTS

| | | | |
|---|---|---|---|
| 2,639,213 | 5/1953 | Barth | 106/38.22 |
| 3,142,715 | 7/1964 | Burk | 264/338 |
| 3,472,894 | 10/1969 | Barlett | 264/338 |
| 3,879,490 | 4/1975 | Villa | 106/38.25 |
| 4,118,235 | 10/1978 | Horiuchi et al. | 264/388 |
| 4,308,063 | 12/1981 | Horiuchi et al. | 106/38.22 |

FOREIGN PATENT DOCUMENTS 782615 9/1957 United Kingdom .............. 264/338

*Primary Examiner*—Ronald W. Griffin
*Attorney, Agent, or Firm*—Larson and Taylor

[57] ABSTRACT

A mold release composition consisting essentially of:
 (A) a fluorine-containing polyether comprising 3-perfluoroalkyl-1,2-epoxypropane having the formula

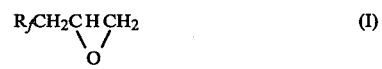
(I)

wherein $R_f$ represents a perfluoroalkyl group containing from 5 to 13 carbon atoms and
 (B) at least one additive selected from the group consisting of a silicone oil, silicone varnish, a wax and a highly fluorinated organic compound having a boiling point above 100° C.

9 Claims, No Drawings

MOLD RELEASE COMPOSITION

This invention relates to a mold release composition and more particularly to a mold release composition for use in the production of molded articles such as of polymeric materials including synthetic resins or rubbers, or foamed products thereof.

It is well known to use as a mold release agent natural or synthetic compounds such as silicone oil, mineral oils, paraffin waxes, aliphatic acid derivatives, glycols, etc., or inorganic substances such as talc, mica, etc., in the production of molded articles of polymeric materials. In general, these mold release agents are applied to a mold prior to introduction of a material to be molded. When the lifetime of a mold release agent is short, the release agent is usually applied prior to each cycle in which a material is introduced to be molded. Silicone oil is most widely employed as mold release agent due to its excellent releasing property. In the case, however, when a material having a strong adhering tendency, for example, a urethane or epoxy resin, is to be molded, it is necessary to employ silicone oil in conjunction with fine powder of silicon oxide so as to improve mechanical strength of the film of the mold release agent and, moreover, it is required to apply them to a mold in a large amount. The application of the mold release agent in such a large amount leads to transfer of the mold release agent to molded article. This makes impossible the after-treatments of the surfaces of the molded article, e.g., a coating or adhering treatment, and is undesirable from a viewpoint of material cost.

Further, the application of the mold release agent in a large amount causes accumulation of sediments of the mold release agent or molded material on the surface of the mold during repetition of the cycle of molding. Thus, it is required to wash the mold which frequently results in reduction of molding efficiency.

Certain of fluorine-containing compounds are known to have a mold release ability because of their low surface energy. A mold release composition comprising a phosphoric acid ester of perfluoroalkyl group-containing alcohol and an additive such as silicone oil is disclosed in U.S. Pat. No. 4,308,063 as a mold release agent which has good mold release ability.

However, the mold release composition comprising such a perfluoroalkyl group-containing phosphoric acid ester, which has an reactive functional group, partly reacts with the surface of the polymeric materials during the molding operation to spoil the surface of the molded articles.

We have made an intensive study for an improved mold release agent which can overcome the disadvantages involved in the known mold release agents or compositions and found that a mold release composition comprising a certain polyether compound having a perfluoroalkyl group in the molecule in combination with at least one substance of a specific type can overcome the disadvantages of the prior mold release agents or compositions. It has been also found that such compositions are effective even when used at a low concentration of the mold releasing agent and exhibit a prolonged releasing lifetime. The present invention is based on the above findings.

It is, accordingly, an object of the present invention to provide a mold release composition which can exhibit improved mold release properties.

Another object of the present invention is to provide a mold release composition having a prolonged mold release lifetime.

Other objects, features and advantages of this invention will become more apparent from the detailed description to follow.

The present invention provides a mold release composition consisting essentially of:

(A) a fluorine-containing polyether comprising 3-perfluoroalkyl-1,2-epoxypropane having the formula

wherein $R_f$ represents a perfluoroalkyl group-containing from 5 to 13 carbon atoms and (B) at least one additive selected from the group consisting of a silicone oil, silicone varnish, a wax and a highly fluorinated organic compound having a boiling point above 100° C.

The fluorine-containing polyether means a homopolymer of said 3-perfluoroalkyl-1,2-epoxypropane or a mutual copolymer of at least two members of said 3-perfluoroalkyl-1,2-epoxypropane or a copolymer of said 3-perfluoro-1,2-epoxypropane and other kind of epoxide.

The 3-perfluoroalkyl-1,2-epoxypropane represented by the formula

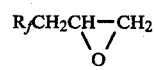

suitable for use in the composition of the invention include

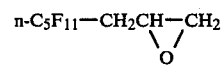

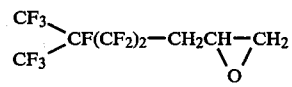

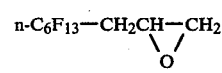

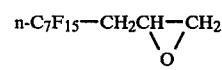

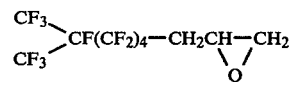

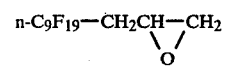

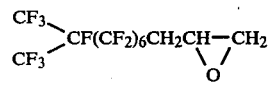

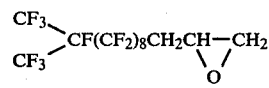

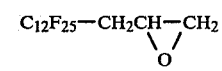

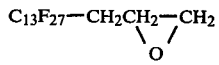

The preferred epoxide copolymerizable with the 3-perfluoroalkyl-1,2-epoxypropane are ethylene oxide, propylene oxide, epichlorohydrin, epifluorohydrin, perfluoropropylene oxide, isobutylene oxide, butadiene oxide, styrene oxide, methylglycidyl ether and allylglycidyl ether.

The fluorine-containing polymer of the present invention are known from Japanese Preliminary Publication of Patent No. 25361 of 1971 or British Pat. No. 782615.

The mold release agent comprising the fluorine-containing polyether of the present invention exhibits excellent release ability even when applied to the surface of the mold in a small amount and is free from sticking to or soiling the surface of the molded articles.

In the fluorine-containing polyether (A) of the present invention, 3-perfluoroalkyl-1,2-epoxypropane is contained preferably in an amount of about 30 to about 100 mole %. With the content of less than 30 mole %, the fluorine-containing polymer gives poor release ability to the resulting composition comprising the additive (B).

The fluorine-containing polyether (A) is used in conjunction with at least an additive selected from a silicone oil, a silicone varnish, a wax and a highly fluorinated compound having a boiling point above 100° C.

The silicone oil useful in the present invention is a noncurable polysiloxane which is liquid or semisolid at room temperature and has a boiling point of not lower than 100° C. and a melting point of not higher than 150° C. It is preferred that the polysiloxane have an alkyl group, a fluoroalkyl group, a vinyl group, a phenyl group or the like at the side chain thereof and, most preferably, a high content of methyl group.

As the silicone varnish may be used any of those heretofore known such as methyl silicone varnish. Methyl silicone varnish is a three dimensional network copolymer comprising a various combination of structural units, such as $SiO_2$, $CH_3SiO_{3/2}$, $(CH_3)_2SiO$ and $(CH_3)_3SiO_{1/2}$. The copolymer may contain cross-linkable group such as hydroxy group. Most preferable is a silicone varnish soluble in an organic solvent.

The highly fluorinated organic compound means a compound in which hydrogen atoms capable of being fluorinated are highly fluorinated and which has a boiling point not lower than 100° C. Such compounds include highly fluorinated alkyl compounds such as $H(CF_2CF_2)_nCF_3$, $[(CF_3)_2CF(CF_2)_n]_2$, $Cl(CF_2CF_2)_nCHF_2$, etc., wherein n is an integer of 1 to 15, inner olefins and derivatives thereof such as hexafluoropropene oligomers, polyethers such as hexafluoropropylene oxide, tetrafluoroethylene oxide, etc., and highly fluorinated amines such as $(C_4F_9)_3N$. Examples of suitable highly fluorinated organic compounds include $(CF_3)_2CF(CF_2)_4CF(CF_3)_2$ (b.p. 207° C.), $CF_3(CF_2)_4CCl_3$ (b.p. 143° C.), $Cl(CF_2CFCl)_3Cl$ (b.p. 203° C.), $C_2F_5CFClCf_2CFCl_2$ (b.p. 119° C.), $C_9F_{20}$ (b.p. 125° C.), $C_9HF_{19}$ (b.p. 138° C.), $CF_2Cl(CF_2)_5$ (b.p. 123° C.), $CHF_2(CF_2)_7CF_2Cl$ (b.p. 162° C.), $C_{11}HClF_{22}$ (b.p. 191° C.),

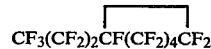

(b.p. 123°–126° C.),

(b.p. 225° C.), hexafluoropropene trimer (b.p. 110°–114° C.), tetrafluoroethylene pentamer (b.p. 130°–132° C.), perfluorodecalin (b.p. 142° C.), perfluorobutyltetrahydrofuran (b.p. 102° C.), $F[CF(CF_3)CF_2O]_4CHFCF_3$ (b.p. 193° C.), $(C_4F_9)_3N$ (b.p. 174° C.), etc. Most of the above-mentioned compounds are liquid at a normal temperature and some of them are solid. All of the compounds have melting points below 150° C.

The waxes usable in the present invention include animal and vegetable waxes conventionally used as well as mineral or synthetic waxes such as paraffin wax. The waxes preferably usable in the present invention are vegetable waxes composed of aliphatic acid esters such as carnauba wax, candelilla wax, etc., mineral waxes such as polyethylene wax, micro wax etc., and animal waxes such as wool wax, bees wax, etc. These waxes may be used singly or in combination of two or more waxes.

The silicone oil, silicone varnish, highly fluorinated compound and wax may be used in wide ranges of amounts and, preferably, in the range of 0.1 to 10 parts by weight, most preferably 0.3 to 5 parts by weight, per part by weight of the fluorine containing polyether.

In addition to the above additives, the mold release composition of the present invention may be added, if preferred, with any of ordinarily employed anionic, cationic and nonionic surface active agents to improve stability and wettability of the composition or powder of fluororesin, fluorinated carbon, aluminum, copper, mica, etc. to improve releasability and lubricating property.

The mold release composition of the present invention may be used in a form of solution or dispersion in a liquid medium such as an organic solvent or an aqueous medium.

The organic solvents usable as the liquid medium in the present invention are, for example, alcohols such as methanol, ethanol, propanol, isopropanol, etc., ketones such as acetone, methyl ethyl ketone, methyl isobutyl ketone, etc., ethers such as ethyl ether, isopropyl ether, dioxane, tetrahydrofuran, etc., esters such as ethyl acetate, butyl acetate, etc., halogenated hydrocarbons such as carbon tetrachloride, methylene dichloride, ethylene dichloride, trichloroethylene, perchloroethylene, trichloroethane, trichlorofluoromethane, 1,2-difluorotetrachloroethane, 1,1,2-trichlorotrifluoroethane, etc. These organic solvents may be used singly or in combination.

The mold release composition of the present invention can be prepared as follows.

When an organic solvent is used as the liquid medium, the fluorine containing polyether is dissolved in a solvent such as trichlorotrifluoroethane and other additives such as silicone oil, silicone varnish, wax and highly fluorinated organic compounds are dissolved in a solvent such as toluene or xylene, and the both solutions are mixed to produce the composition. Aqueous mold release composition of the invention can be prepared by dispersing the fluorine containing polyether in water with use of a cationic-, anionic- or nonionic surface active agent and then mixing therewith a dispersion of additive such as silicone oil similarly prepared.

The concentration of the mold release agent (i.e., a total concentration of a fluorine containing polyether and at least an additive selected from a silicone oil, a silicone varnish, a wax and a highly fluorinated compound) in the mold release composition generally ranges from 0.1 to 50% by weight. For only one cycle of molding operation, a concentration of 0.1 wt. % or less is sufficient. Where a long lifetime is required of a single application of the mold release agent, the concentration is preferably in the range of 0.5 to 20 wt. %, more preferably 1 to 10 wt. %.

Examples of molding materials to which the mold release composition of the present invention is suitably applicable include synthetic resins or rubbers such as polyurethane, chloroprene rubber, polycarbonate, fluorine-contained rubber, epoxy resin, phenolic resin, vinyl chloride resin, etc., and a variety of natural resins and natural rubber and foaming materials thereof. In the case when polyurethane foam is to be molded, the application of the known mold release agent causes reduction of mold releasability or spoiling of the surface of the molded product because of the reaction of the reactive isocyanate group of the polyurethane with the functional group of the mold release agent. The mold release composition of the present invention is free from such drawbacks since the functional group is previously removed therefrom by a reaction as apparent from the synthesis process of the polyether.

Application of the mold release composition to mold is feasible by conventional methods. For example, it is sufficient to apply the mold release composition of the invention to a mold by immersion, spraying, brushing or rubbing with impregnated cloth, and then to remove the liquid medium by evaporation. The evaporation can be omitted for some of the molding materials, but for molding urethane resin the liquid medium must be completely removed by evaporation.

The following examples serve to make further distinct the features of the invention.

EXAMPLE 1

Preparation of Mold Release Composition

1. Materials used (A) Fluorine-containing polyethers

The four kinds of homopolymer or copolymer as listed in Table 1 were used.

(B) Additives

The additives as listed in Table 2 were used.

TABLE 1

| No. | Monomer kind | Composition (mol %) |
|---|---|---|
| 1 | (I) | 100 |
| 2 | (II) | 100 |
| 3 | (II) | 70 |
|   | epichlorohydrin | 30 |
| 4 | (II) | 40 |
|   | propyleneoxide | 30 |

TABLE 1-continued

| No. | Monomer kind | Composition (mol %) |
|---|---|---|
|   | phenylglycidylether | 30 |

Note:
(I): $CF_3CF_2(CF_2CF_2)_3CH_2\overset{\diagdown\diagup}{\underset{O}{C}}HCH_2$ (II): $(CF_3)_2CF(CF_2CF_2)_m CH_2\overset{\diagdown\diagup}{\underset{O}{C}}HCH_2$ (II) is a mixture of monomers of m = 3 55 mol %, m = 4 28 mol %, m = 5 11 mol %, m = 6 4 mol % and m = 7 1 mol %.

TABLE 2

| Name of Additive | Trade Name | Composition | Producing Company |
|---|---|---|---|
| a | Silicone SH 203 | methylalkylsiloxane oil | Toray Silicone Co. |
| b | Silicone 350 cs | dimethylsiloxane oil | Toray Silicone Co. |
| c | Silicone Emulsion SH 7036 | 35% aqueous emulsion of (b) | Toray Silicone Co. |
| d | Silicone KS 707 | silicone varnish | Shinetsu Silicone Co. |
| e | Carnauba wax | 10% toluene solution | — |
| f | Difloil | $Cl(CF_2CFCl)_{8-10}Cl$ | Daikin Kogyo Co. |

2. Preparation of solution of (A)

The fluorine-containing polyether listed in Table 1 was dissolved in a solvent such as 1,1,2-trifluorotrichloroethane when used as a solvent type mold release composition.

When used as an aqueous mold release composition, 10 parts of the fluorine-containing polyether of Table 1 was dissolved in 15 parts of methylisobutylketone. Then, the resulting solution was mixed with 0.2 parts of Nonion HS 240 (nonionic surface active agent produced by Nippon Oil & Fats Co.), 0.4 parts of Nymine S 215 (nonionic surface active agent produced by Nippon Oil & Fats Co.) and 74.4 parts of water in a homomixer under high speed agitation for 30 minutes to prepare a milk-white aqueous emulsion which was diluted to a desired concentration for use.

3. Preparation of Composition

The above components of (A) and (B) were mixed in the ratio as indicated in Table 3 for release test with a rigid urethane foam and in the ratio as indicated in Table 4 for release test with an epoxy resin. For comparison, mold release compositions consisting of the fluorine containing polyether alone or the additive (B) alone are also listed in Tables 3 and 4.

4. Release tests with rigid urethane foams (1) Rigid urethane foam composition for the test:

| Solution A | |
|---|---|
| PPG-SU-450L | 100 parts |
| (Polyol produced by Mitsui-Toatsu Co.) | |
| CCl₃F (foaming agent) | 44 parts |
| triethylenediamine | 0.3 parts |
| N,N—diethanolamine | 1.5 parts |
| L-5320 (foam regulating agent) | 1.5 parts |
| (product of Japan UNITIKA Ltd.) | |
| Solution B | |
| 4,4'-diphenylmethane diisocyanate | 115.4 parts |

(2) Test method

The mold release compositions were each applied onto an aluminum mold (10 cm×10 cm) by brushing and air-dried. Then, the solutions A and B prepared as above were mixed with each other under agitation at 1500 rpm. The resulting mixture was immediately poured onto the aluminum mold, followed by foaming and hardening at room temperature of 25° C. After left standing for 30 minutes, the specimen thus prepared was tested for 90° tear strength with use of a tension tester (drawing speed: 200 mm/min) to determine the release ability of the tested mold release compositions.

After single application of a mold release composition, the lifetime of the mold release composition was determined by repeating the cycle of the molding operation, without further application of the release composition, until the release ability decreased down. That is, mold release composition was first applied to the mold and then the molding operation was repeated without further application of the release composition as long as the molded articles can be released from the mold in a complete form. The lifetime was determined as the number of the molded articles released in a complete form. The values of the lifetime listed in Table 3 were each taken as an average value of three measurements obtained under the same conditions. The results are given in Table 3.

TABLE 3

|  | Experiment No. | Fluorine-containing polyether (A) | | Additives (B) | | Solvent or dispersion medium | Test results | |
|---|---|---|---|---|---|---|---|---|
|  |  | kind | content in the composition (%) | kind | content in the composition (%) |  | Release ability (g/cm$^2$) | Release lifetime (times) |
| Comp. Example | 1 | 1 | 2 | — | — | 1,1,2-trifluorotrichloroethane | 56 | 2 |
|  | 2 | 2 | 2 | — | — | 1,1,2-trifluorotrichloroethane | 50 | 2 |
|  | 3 | 3 | 2 | — | — | 1,1,2-trifluorotrichloroethane | 72 | 2 |
|  | 4 | 4 | 2 | — | — | 1,1,1-trichloroethane | 82 | 1 |
|  | 5 | — | — | a | 2 | 1,1,1-trichloroethane | broken | 0 |
|  | 6 | — | — | b | 2 | 1,1,2-trifluorotrichloroethane | broken | 0 |
|  | 7 | — | — | d | 2 | toluene | 32 | 3 |
|  | 8 | — | — | e | 2 | " | 167 | 1 |
|  | 9 | — | — | f | 2 | 1,1,1-trichloroethane | 250 | 1 |
|  | 10 | — | — | b | 1.0 | 1,1,1-trichloroethane | 52 | 2 |
|  |  |  |  | d | 1.0 |  |  |  |
| Example | 1 | 1 | 1.0 | a | 1.0 | 1,1,2-trifluorotrichloroethane | 21 | 6 |
|  | 2 | 2 | 1.0 | b | 1.0 | 1,1,2-trifluorotrichloroethane | 18 | 7 |
|  | 3 | 4 | 1.0 | b | 1.0 | toluene* 1,1,1-trichloroethane | 36 | 3 |
|  | 4 | 3 | 1.0 | f | 1.0 | 1,1,2-trifluorotrichloroethane | 38 | 3 |
|  | 5 | 4 | 1.0 | a | 0.5 | toluene* 1,1,1-trichloroethane | 16 | 6 |
|  |  |  |  | e | 0.5 |  |  |  |
|  | 6 | 2 | 1.0 | b | 0.5 | 1,1,2-trifluorotrichloroethane | 10 | 7 |
|  |  |  |  | e | 0.5 |  |  |  |
|  | 7 | 2 | 0.3 | b | 1.4 | 1,1,1-trichloroethane | 14 | 6 |
|  |  |  |  | f | 0.3 |  |  |  |
|  | 8 | 1 | 0.5 | b | 1.0 | 1,1,2-trifluorotrichloroethane | 8 | 8 |
|  |  |  |  | d | 0.5 |  |  |  |
|  | 9 | 4 | 0.5 | c | 1.0 | water | 16 | 6 |
|  |  |  |  | d | 0.5 |  |  |  |

*A mixture of toluene and 1,1,1-trichloroethane (1:2)

5. Release tests with an epoxy resin
(1) Epoxy resin composition

| Solution A | |
|---|---|
| Epikote #828 (product of Shell International Chemicals Corp.) | 100 parts |
| Solution B | |
| Triethylenetetramine | 10 parts |

(2) Test method

The mold release composition were each applied onto an aluminum base mold of 10 cm×10 cm in size by brushing and air-dried. Then, the solutions A and B were well mixed with each other. A chopstrand mat of glass fiber of 10 cm×10 cm (product of Nitto-Spinning Co.) impregnated with the resulting solution was placed on the base mold on which an upper mold was placed and pressed. Then hardening of epoxy resin was effected by allowing to stand for a day at room temperature of 25° C. The specimen thus prepared was tested for 90° tear strength with use of a tension tester (drawing speed: 200 mm/min) to determine the release ability.

After single application of a mold release composition, the lifetime of the mold release composition was determined by repeating the cycle of the molding operation, without further application of the release composition, until the release ability decreased down. That is, mold release composition was first applied to the mold and then the molding operation was repeated without further application of the release composition as long as the molded articles can be released from the mold in a complete form. The lifetime was determined as the number of the released molded articles released in a complete form. The values of the lifetime listed in Table 4 were each taken as an average value of three measurements obtained under the same conditions. The results are shown in Table 4.

release agent, i.e., perfluoroalkyl group-containing phosphoric acid ester were tested for the release ability.

1. Mold release composition tested

| Composition 1 | |
|---|---|
| $CF_3CF_2(CF_2CF_2)_3CH_2CH_2OPO(OH)_2$ | 1 part |
| dimethylsiloxanoil (350 cs) | 1 part |
| 1,1,2-trifluorotrichloroethane | 98 part |
| Composition 2 | |
| fluorine-containing polyether (the kind 2 in Table 1) | 1 part |
| dimethylsiloxane oil | 1 part |
| 1,1,2-trifluorotrichloroethane | 98 part |

2. Release test with a urethane resin
(1) Urethane resin composition for the test

| Solution A | |
|---|---|
| Millionate MR-200 (product of Japan Polyurethane Co.) | 110 parts |
| Solution B | |
| Millionate M-10 (product of Japan Polyurethane Co.) | 100 parts |

TABLE 4

| | Experiment No. | Fluorine-containing polyether (A) | | Additives (B) | | Solvent or dispersion medium | Test results | |
|---|---|---|---|---|---|---|---|---|
| | | kind | content in the composition (%) | kind | content in the composition (%) | | Release ability (g/cm²) | Release lifetime (times) |
| Comp. Example | 1 | 1 | 2 | — | — | 1,1,2-trifluorotrichloroethane | 42 | 1 |
| | 2 | 2 | 2 | — | — | 1,1,2-trifluorotrichloroethane | 37 | 1 |
| | 3 | 3 | 2 | — | — | 1,1,2-trifluorotrichloroethane | 56 | 1 |
| | 4 | 4 | 2 | — | — | 1,1,1-trichloroethane | 68 | 1 |
| | 5 | — | — | a | 2 | 1,1,1-trichloroethane | broken | 0 |
| | 6 | — | — | b | 2 | 1,1,2-trifluorotrichloroethane | broken | 0 |
| | 7 | — | — | d | 2 | toluene | 30 | 2 |
| | 8 | — | — | e | 2 | " | 52 | 1 |
| | 9 | — | — | f | 2 | 1,1,1-trichloroethane | 67 | 1 |
| | 10 | — | — | b | 1.0 | 1,1,1-trichloroethane | 36 | 1 |
| | | | | d | 1.0 | | | |
| Example | 1 | 1 | 1.0 | a | 1.0 | 1,1,2-trifluorotrichloroethane | 12 | 5 |
| | 2 | 2 | 1.0 | b | 1.0 | 1,1,2-trifluorotrichloroethane | 8 | 5 |
| | 3 | 3 | 1.0 | b | 1.0 | 1,1,2-trifluorotrichloroethane | 16 | 3 |
| | 4 | 4 | 1.0 | f | 1.0 | 1,1,2-trifluorotrichloroethane | 22 | 3 |
| | 5 | 4 | 1.0 | a | 0.5 | toluene* 1,1,1-trichloroethane | 12 | 4 |
| | | | | e | 0.5 | | | |
| | 6 | 2 | 0.3 | b | 1.4 | 1,1,2-trifluorotrichloroethane | 9 | 5 |
| | | | | f | 0.3 | | | |
| | 7 | 2 | 0.5 | b | 1.0 | 1,1,2-trifluorotrichloroethane | 2 | 8 |
| | | | | d | 0.5 | | | |
| | 8 | 4 | 0.5 | c | 1.0 | water | 8 | 5 |
| | | | | d | 0.5 | | | |

EXAMPLE 2

For comparative purpose, the fluorine-containing polyether of the present invention and the known mold (2) Test method The mold release compositions were each applied to an aluminum mold (10 cm×10 cm) and an epoxy resin mold (10 cm×10 cm) by brushing and air-dried. Then, the solutions A and B were mixed with each other under agitation and the resulting mixture was immediately poured into the above mold followed by hardening at 45° C. for 20 min.

After completion of hardening, the specimens were tested for 90° tear strength to determine the release ability.

After single application of a mold release composition, the lifetime of the mold release composition was determined by repeating the cycle of the molding operation, without further application of the release composition, until the release ability decreased down. That is, mold release composition was first applied to the mold and then the molding operation was repeated without further application of the release composition as long as the molded articles can be released from the mold in a complete form. The lifetime was determined as the number of the released molded articles released in a complete form. The values of the lifetime listed in Table 5 were each taken as an average value of three measurements obtained under the same conditions. The results are shown in Table 5.

TABLE 5

|  | Mold | Mold release composition | Test results | |
|---|---|---|---|---|
|  |  |  | Release ability (g/cm$^2$) | Release lifetime (times) |
| Comp. Example | Aluminum | Composition 1 | 26 | 4 |
|  | Epoxy resin | " | 115 | 1 |
| Example | Aluminum | Composition 2 | 9 | 7 |
|  | Epoxy resin | " | 68 | 5 |

We claim:

1. A mold release composition consisting essentially of:

(A) a fluorine-containing polyether comprising 3-perfluoroalkyl-1,2-epoxypropane having the formula $$R_fCH_2CHCH_2 \quad \underset{O}{\diagdown\diagup} \quad (I)$$

wherein $R_f$ represents a perfluoroalkyl group containing from 5 to 13 carbon atoms and (B) at least one additive selected from the group consisting of a silicone oil, silicone varnish, a wax and a highly fluorinated organic compound having a boiling point above 100° C.

2. A composition according to claim 1 wherein said fluorine-containing polyether is a homopolymer of 3-perfluoroalkyl-1,2-epoxypropane of the formula (I).

3. A composition according to claim 1 wherein said fluorine-containing polyether is a copolymer of at least two members of 3-perfluoroalkyl-1,2-epoxypropane of the formula (I) with or without another epoxide copolymerizable therewith.

4. A composition according to claim 1 wherein said fluorine-containing polyether is a copolymer of 3-perfluoroalkyl-1,2-epoxypropane of the formula (I) and another epoxide copolymerizable therewith.

5. A composition according to claim 3 wherein said copolymer contains at least about 30 mol % of 3-perfluoroalkyl-1,2-epoxypropane of the formula (I).

6. A composition according to claim 1 wherein said additive (B) is present in an amount of 0.1 to 10 parts by weight per part by weight of said fluorine-containing polyether (A).

7. A composition according to claim 1 wherein said composition is an aqueous solution or dispersion.

8. A composition according to claim 1 wherein said composition is a solution or dispersion in an organic solvent.

9. A composition according to claim 7 wherein said solution or dispersion contains said fluorine-containing polyether and said additive in a total concentration of 0.1 to 50% by weight.

* * * * *